United States Patent [19]

Kanda

[11] Patent Number: 4,883,260

[45] Date of Patent: Nov. 28, 1989

[54] ELASTIC BUSHING HAVING FLUID CHAMBER FILLED WITH HIGHLY VISCOUS FLUID

[75] Inventor: Ryouji Kanda, Komaki, Japan

[73] Assignee: Tokai Rubber Industries, Ltd., Japan

[21] Appl. No.: 242,823

[22] Filed: Sep. 12, 1988

[30] Foreign Application Priority Data

Sep. 16, 1987 [JP] Japan ................................ 62-231587

[51] Int. Cl.$^4$ ........................ F16F 1/36; F16M 13/00; B60G 11/26
[52] U.S. Cl. ................................ 267/140.1; 248/562; 280/710
[58] Field of Search ...................... 267/140.1, 219, 35, 267/293, 292, 276, 140.1 R, 140.1 C, 281, 279; 180/300, 312; 248/562, 636, 638; 123/192 R, 195 A; 280/710, 716; 188/322.5

[56] References Cited

U.S. PATENT DOCUMENTS

| | | | |
|---|---|---|---|
| 3,907,079 | 9/1975 | Chapman | 188/268 X |
| 4,717,111 | 1/1988 | Saito | 248/562 |
| 4,723,791 | 2/1988 | Miura et al. | 267/292 |

FOREIGN PATENT DOCUMENTS

| | | | |
|---|---|---|---|
| 3723135 | 1/1988 | Fed. Rep. of Germany | 267/140.1 |
| 0034541 | 2/1985 | Japan | 267/140.1 |
| 0179542 | 9/1985 | Japan | 267/140.1 |

Primary Examiner—Robert J. Oberleitner
Attorney, Agent, or Firm—Oliff & Berridge

[57] ABSTRACT

A fluid-filled elastic bushing including an annular elastic body which is interposed between an inner and an outer sleeve and has a pair of axially intermediate connecting portions which define diametrically opposed parts of the circumference of the elastic body. The elastic body has an opening formed through its axially intermediate portion in its diametric direction, such that the opening is partially defined by the connecting portions and is open in diametrically opposed parts of the outer circumferential surface of the elastic body which are located between the connecting portions. The opening is closed by the outer sleeve, at the diametrically opposed parts of the outer circumferential surface of the elastic body, whereby a fluid chamber filled with a highly viscous fluid is defined around an axially intermediate portion of the inner sleeve. The bushing includes a restrictor member fixedly accommodated within the fluid chamber, so as to substantially divide the fluid chamber into two axially spaced-apart two parts, and so as to cooperate with the connecting portions of the elastic body and/or the inner circumferential surface of the outer sleeve, thereby defining a restricted portion or portions of the fluid chamber.

12 Claims, 2 Drawing Sheets

ELASTIC BUSHING HAVING FLUID CHAMBER FILLED WITH HIGHLY VISCOUS FLUID

BACKGROUND OF THE INVENTION

1. Field of the Invention

The present invention relates in general to an elastic bushing for flexibly connecting a shaft member and a tubular support member, primarily for damping or accommodating vibrations applied thereto in its axial direction. More particularly, the present invention is concerned with improvements in a fluid-filled elastic bushing which utilizes shearing of a viscous fluid having a high kinematic viscosity, for damping axial vibrations applied to the bushing.

2. Discussion of the Prior Art

There is known a vibration-damping elastic bushing of a type which is interposed between a shaft member and a tubular support member, for elastically connecting these two members, such that vibrations received in the axial direction of the bushing are particularly suitably damped or isolated. Some of this type of elastic bushings are required to exhibit excellent vibration damping capability for a wide range of frequency of the axially applied vibrations. These elastic bushings may be further required to provide a relatively low static spring constant for vibrations applied in the radial direction.

For example, a rear member mount used in a rear suspension of a semi-trailing arm type of a motor vehicle is required to provide a high damping effect for the axial vibrations of a frequency range of about 10–15 Hz, in order to reduce rattling of the rear suspension due to windup vibrations upon starting of the vehicle, and at the same time provide a high damping effect for the axial vibrations having higher frequencies of about 30–40 Hz, in order to restrain rattling of the rear suspension during running of the vehicle on a bumpy road surface. The same rear member mount is also required to provide a low static spring constant in its radial direction (which includes the running direction of the vehicle), for effectively dealing with the harshness shocks applied to the vehicle.

The known elastic bushing such as the rear member mount discussed above generally includes: an inner sleeve in which a shaft member to be flexibly connected to a tubular support member by the bushing is fixedly inserted; an outer sleeve which is fixedly fitted in the tubular support member; and an elastic body made of a rubber material, for elastically connecting the inner and outer sleeves for damping primarily the axially applied vibrations, based on elastic deformation of the elastic body. This known arrangement of the elastic bushing is structurally limited in its damping capability with respect to the vibrations applied in the axial direction. Thus, there has been a need of improving the elastic bushing of the type indicated above.

In the light of the above need associated with the elastic bushing employing the elastic body interposed between the inner and outer sleeves, there has been recently proposed a so-called fluid-filled elastic bushing which has a pair of fluid chambers formed in the elastic body such that the two fluid chambers are spaced apart from each other in the axial direction of the bushing. The fluid chambers are filled with a fluid having a relatively low viscosity, and are held in communication with a suitable orifice or orifices, or flow restrictor passage means, so that the axially received vibrations may be effectively damped, due to the existence of the fluid masses in the fluid chambers and restrictor passage means.

In the fluid-filled elastic bushing utilizing the low-viscosity fluid as indicated above, vibrations applied to the bushing in its axial direction cause the fluid to flow through the restrictor passage means between the two fluid chambers, whereby the vibrations may be effectively damped based on resonance of the masses of the low-viscosity fluid flowing through the restrictor passage means.

Since the elastic bushing with the fluid chambers filled with a low-viscosity fluid operates to damp the axial vibrations based on the resonance of the fluid masses, the damping capability of the bushing has a considerably high degree of dependence upon the frequency of the input vibrations. Namely, the fluid-filled elastic bushing in question cannot cover a wide range of frequency of the input axial vibrations. In other words, the frequency range over which the elastic bushing is capable of effectively damping the axial vibrations is considerably limited, as compared with the frequency range of the actually received vibrations that should be damped.

Described more specifically, if the elastic bushing utilizing a low-viscosity fluid is used as a rear member mount of a motor vehicle, and the restrictor passage means and other parts of the bushing are adapted so that the resonance frequency range of the fluid corresponds to a frequency range of about 10-15 Hz of the input vibrations, the rear member mount is highly capable of damping the vibrations of about 10-15 Hz frequencies, but is not capable of providing a sufficient damping effect for the vibrations of about 30-40 Hz. If the rear member mount is adapted to provide a high damping effect for the 30-40 Hz vibrations, on the other hand, the same rear member mount cannot satisfactorily deal with the 10-15 Hz vibrations. Thus, the known elastic bushing utilizing the low-viscosity fluid has a problem that should be solved.

SUMMARY OF THE INVENTION

It is accordingly a object of the present invention to provide an improved fluid-filled elastic bushing such as a rear member mount of a motor vehicle, for flexibly connecting a shaft member to a tubular support member, so as to damp primarily axially received vibrations, which elastic bushing is capable of providing an excellent damping effect for a wide range of frequency of the axial vibrations, as well as exhibiting a relatively low static spring constant for vibrations received in the radial direction.

The above object may be accomplished according to the principle of the present invention, which provides a fluid-filled elastic bushing for flexibly connecting a shaft member to a tubular support member, to primarily damp vibrations applied thereto in an axial direction of the shaft member, comprising: (a) an inner sleeve in which the shaft member is fixedly inserted; (b) an outer sleeve disposed radially outwardly of the inner sleeve, and fixedly fitted in the tubular support member; (c) an annular elastic body interposed between the inner and outer sleeves, for elastically connecting the inner and outer sleeves; and (d) a restrictor member. The elastic body includes a pair of axially intermediate connecting portions which define a pair of diametrically opposed parts of an outer circumference of the elastic body. The connecting portions have a pair of axial holes formed therethrough, respectively. The elastic body has an opening formed through an axially intermediate portion thereof in a diametric direction thereof such that the opening is partially defined by the connecting portions and is open in a pair of diametrically opposed parts of an outer circumferential surface of the elastic body which are located between the pair of connecting portions in a circumferential direction of the elastic body. The opening is closed by the outer sleeve, at the diametrically opposed parts of the outer circumferential surface of the elastic body, whereby a fluid chamber filled with a viscous fluid having a high kinematic viscosity is defined around an axially intermediate portion of the inner sleeve. The restrictor member is supported by the inner sleeve such that the restrictor member is accommodated within the fluid chamber, so as to substantially divide the fluid chamber into two parts spaced apart from each other in an axial direction of the inner sleeve. The restrictor member cooperates with at least one of the pair of axially intermediate connecting portions of the elastic body and an inner circumferential surface of the outer sleeve, to define at least on restricted portion of the fluid chamber. The two parts of the fluid chamber are held in communication with each other through the above-indicated at least one restricted portion.

In the fluid-filled elastic bushing of the present invention constructed as described above, vibrations applied to the bushing in the axial direction cause the restrictor member supported by the inner sleeve to be displaced relative to the outer sleeve in the axial direction. The axial displacement of the restrictor member relative to the outer sleeve causes shearing stresses to be applied to the mass of the highly viscous fluid existing in the restricted portion or portions of the fluid chamber which is/are defined between the restrictor member and the pair of axially intermediate connecting portions of the elastic body, and/or between the restrictor member and the inner circumferential surface of the outer sleeve. Based on the shearing stresses thus applied to the highly viscous fluid, the input axial vibrations can be damped, over a comparatively wide range of frequency of the vibrations.

Further, the instant elastic bushing provides a relatively low static spring constant in the radial direction in which the axially intermediate connecting portions of the elastic body are diametrically opposed, since the pair of axial holes are formed axially through the respective connecting portions of the elastic body.

Thus, the instant fluid-filled elastic bushing is capable of providing an excellent damping effect for a wide range of frequency of the axial vibrations, as well as exhibiting a relatively low static spring constant for vibrations received in the radial direction in which the connecting portions of the elastic body are diametrically opposed. Where the instant bushing is used as a rear member mount in a semi-trailing arm type rear suspension of an automotive vehicle, the bushing is positioned such that the connecting portions of the elastic body are opposed in the running direction of the vehicle. The rear member mount can effectively damp the axially received vibrations in a frequency range of about 10–15 Hz and a frequency range of about 30–40 Hz, to thereby reduce or minimize the rattling vibrations of the rear suspension upon starting of the vehicle and during running of the vehicle on a bumpy road surface. Further, the low spring constant characteristic of the instant rear member mount in the radial direction is effective to protect the vehicle body from harsh shocks given to the rear suspension.

Further, the instant fluid-filled elastic bushing does not suffer from a high spring constant for high-frequency input vibrations, unlike the known fluid-filled elastic bushing which utilizes a low-viscosity fluid. Accordingly, the instant elastic bushing exhibits improved damping characteristics for the vibrations and noises having a higher frequency range, as compared with the known elastic bushing utilizing the low-viscosity fluid.

The instant elastic bushing may use a silicone oil whose kinematic viscosity is preferably at least 1000 centistokes, more preferably at least 10,000 centistokes, and most preferably within a range between 100,000 centistokes and 1,000,000 centistokes. However, the highly viscous fluid used in the present elastic bushing is not limited to silicone oil, but other suitable fluids having a high kinematic viscosity preferably higher than 1000 centistokes may be used.

In one form of the instant elastic bushing, the above-indicated at least one restricted portion consists of a first pair of restricted portions defined between the restrictor member and the pair of axially intermediate connecting portions of the elastic body, a second pair of restricted portions defined between the restrictor member and a pair of diametrically opposed parts of the inner circumferential surface of the outer sleeve which are located between the connecting portions of the elastic body in the circumferential direction. In this case, the restrictor member may have a pair of arcuate surfaces which cooperate with the pair of diametrically opposed parts of the inner circumferential surface of the outer sleeve, to define the second pair of restricted portions such that each of the second pair of restricted portions has an arcuate cross sectional shape in a plane perpendicular to the axial direction of the inner sleeve. The pair of arcuate surfaces of the restrictor member may be covered by respective rubber layers, which may be formed as integral parts of the elastic body.

In another form of the present invention, the elastic bushing further comprises a sealing sleeve interposed between the elastic body and the outer sleeve. This sealing sleeve may have a pair of diametrically opposed windows which are aligned with the pair of diametrically opposed parts of the outer circumferential surface of the elastic body.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

To further clarify the concept of the present invention, there will be described in detail the presently preferred embodiment of the invention in the form of a rear member mount used in a rear suspension system of a semi-trailing arm type of a motor vehicle, by reference to the accompanying drawings.

Figure 1:
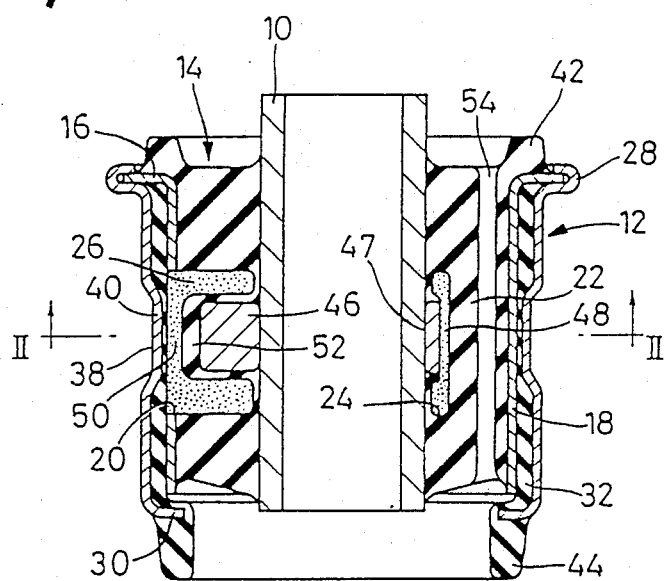
FIG. 1 is an elevational view in longitudinal cross section (taken along line I—I of FIG. 2) of one embodiment of a fluid-filled elastic bushing of the present invention in the form of a rear member mount used for a motor vehicle.
Figure 2:
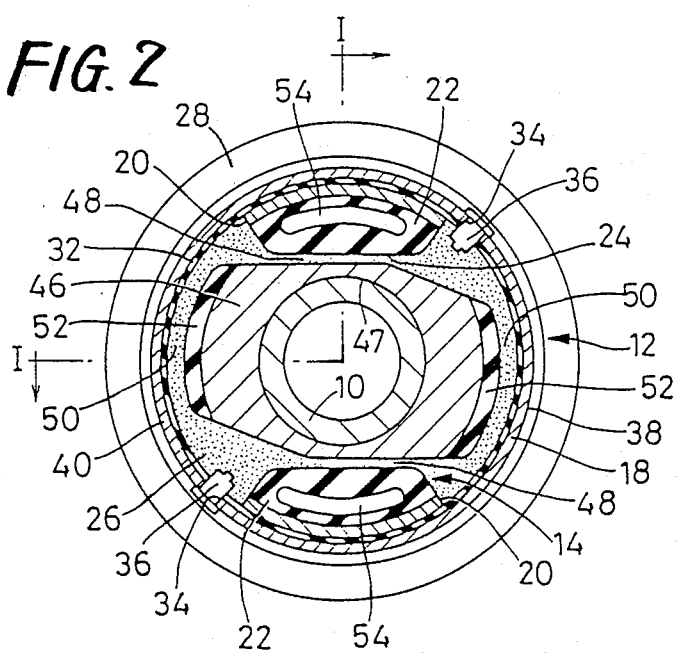
FIG. 2 is a cross sectional view taken along line II—II of FIG. 1.

Referring first to FIGS. 1 and 2, reference numeral 10 denotes a relatively thick-walled inner sleeve made of a metallic material, to which a shaft member (not shown) connected to the body of the vehicle is attached such that the shaft member is inserted in the inner sleeve 10. Further, reference numeral 12 designates a relatively thin-walled outer sleeve also made of a metallic material, which is fixedly fitted in a tubular support member (not shown) of the rear suspension system of the vehicle. The outer sleeve 12 is disposed coaxially with and radially outwardly of the inner sleeve 10, with a suitable radial spacing therebetween. Between the inner and outer sleeves 10, 12, there is interposed an elastic body in the form of a generally annular rubber body 14 formed of a suitable rubber material. The rubber body 14 elastically connects the inner and outer sleeves 10, 12.

Figure 3:
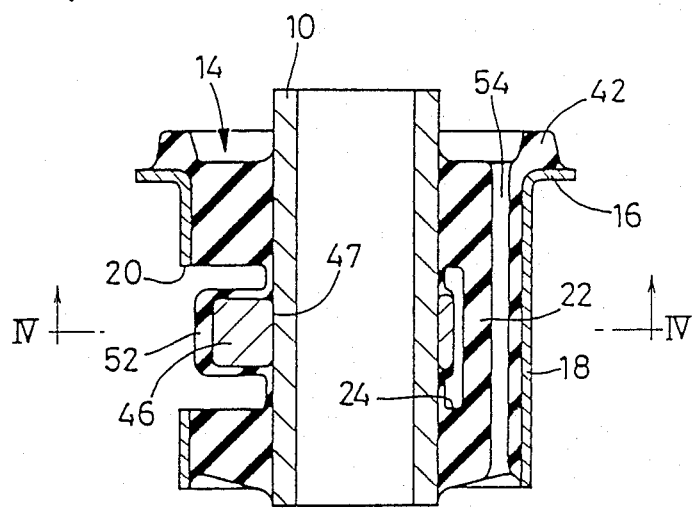
FIG. 3 is an elevational view in longitudinal cross section (taken along line III—III of FIG. 4) of an intermediate product obtained by vulcanization of a rubber material during manufacture of the rear member mount.
Figure 4:
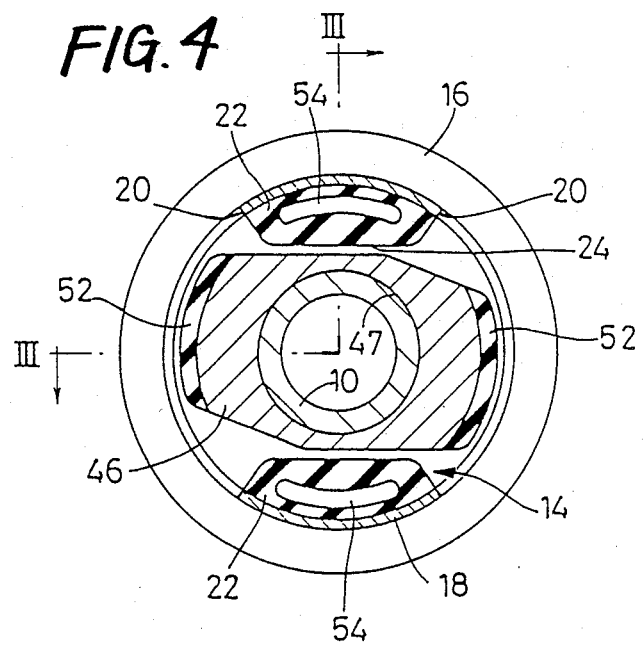
FIG. 4 is a cross sectional view taken along line IV—IV of FIG. 3.

As indicated in FIGS. 3 and 4, the rubber body 14 is bonded at its inner circumferential surface to the outer circumferential surface of the inner sleeve 10, by vulcanization of an unvulcanized rubber material in a suitable mold. To the outer circumferential surface of the rubber body 14, there is bonded a sealing sleeve 18 during the vulcanization process. Thus, an intermediate product as shown in FIGS. 3 and 4 is prepared. The sealing sleeve 18 has an outward flange 16 at its upper end (as seen in FIG. 3), and a pair of rectangular windows 20 in its axially intermediate portion. The windows 20 are opposed to each other in the diametric direction of the sleeve 18. The rubber body 14 includes a pair of axially intermediate connecting portions 22, 22, which define a pair of diametrically opposed parts of the outer circumference of the rubber body 14. The connecting portions 22 have a generally trapezoidal cross sectional shape as seen in the cross sectional view of FIG. 2. The rubber body 14 has an opening 24 formed through an axially middle portion thereof in the radial direction, such that the opening 24 is partially defined by the connecting portions 22. The opening 24 is open in a pair of diametrically opposed parts of the outer circumferential surface of the rubber body 14 which are located between the pair of connecting portions 22 in the circumferential direction of the rubber body 14. The pair of windows 20 formed through the sealing sleeve 18 are aligned with the arcuate open ends of the opening 24, which in turn are aligned with the above-indicated diametrically opposed parts of the outer circumferential surface of the rubber body 14. As indicated in FIG. 2, the opening 24 has a generally rectangular shape viewed in a plane perpendicular to the axis of the bushing or rear member mount, and the inner sleeve 10 is disposed such that its axially intermediate portion extends through the central portion of the opening 24.

As shown in FIGS. 1 and 2, the outer sleeve 12 is fluid-tightly fitted on the outer surface of the sealing sleeve 18 adhering to the rubber body 14 which has the opening 24 formed as described above. Thus, there is formed a fluid chamber 26 which is defined by the connecting portions 22 and other portions of the rubber body 14, the inner circumferential surface of the outer sleeve 12, and a restrictor member 46 which will be described. The fluid chamber 26 is filled with a suitable highly viscous fluid such as a silicone oil, which has a sufficiently high kinematic viscosity, preferably at least 1000 centistokes, more preferably at least 10,000 centistokes, and most preferably within a range of 100,000 centistokes and 1,000,000 centistokes. To improve the durability of the rubber body 14, the sealing sleeve 18 is subjected to a drawing operation at eight circumferential spaced positions, so that the rubber body 14 is radially inwardly pre-compressed, before the outer sleeve 12 is fitted on the sealing sleeve 18.

Described in greater detail, the outer sleeve 12 has a large-diameter caulking portion 28 at one of opposite axial ends thereof, and an inward flange 30 at the other axial end, as indicated in FIG. 1. A sealing rubber layer 32 having a suitable thickness is bonded by means of vulcanization to the inner circumferential surface of the outer sleeve 12. Upon assembling of the outer sleeve 12 and the intermediate product of FIGS. 3 and 4, the outer sleeve 12 with the sealing rubber layer 32 is press-fitted on the sealing sleeve 18, with the caulking portion 28 initially engaging the lower portion of the sealing sleeve 18 (as seen in FIG. 3). In the assembled state of the rear member mount, the sealing rubber layer 32 is held in pressed contact with the outer surface of the sealing sleeve 18, while the caulking portion 28 of the outer sleeve 12 is caulking against the outward flange 16 of the sealing sleeve 18. Before the caulking portion 28 is caulked, the outer sleeve 12 is also radially inwardly compressed by a drawing operation.

In the present embodiment, a pair of inlet holes 34, 34 are formed through the outer sleeve 12, after the outer sleeve 12 is press-fitted on the sealing sleeve 18. Then, the highly viscous fluid is poured into the fluid chamber 26, through the inlet holes 34, and the holes 34 are closed by respective rivet plugs 36. Thus, the fluid chamber 26 is charged with the highly viscous fluid such as a silicone oil as indicated above.

The inlet holes 34 for filling the fluid chamber 26 with the fluid are opposed diametrically of the inner sleeve 10 (outer sleeve 12), and located adjacent to the respective connecting portions 22 of the rubber body 14. More particularly, the outer sleeve 12 has an annular recess 38 in an axially middle portion of the outer circumferential surface, which recess 38 defines a large-diameter axially middle portion 40, as indicted in FIG. 1. The inlet holes 34 are formed through this large-diameter portion 40 of the outer sleeve 12, so that the heads of the rivet plugs 36 are received in the recess 38, in order to prevent the heads from disturbing a press-fitting operation to insert the instant elastic rear member mount in the tubular support member of the rear suspension system of the vehicle.

It follows from the foregoing description that the fluid tightness of the fluid chamber 26 is obtained by a pressed contact of the sealing rubber layer 32 with the sealing sleeve 18 by the radially inward pre-compression of the outer sleeve 12 against the sealing sleeve 18 via the rubber layer 32.

As shown in FIG. 1, the instant bushing is provided with annular rubber buffer layers 42, 44 formed integrally with the rubber body 14 and the sealing rubber layer 32, such that the buffer layers 42, 44 protrude outwardly from the outward flange 16 of the sleeve 18 and from the inward flange 30 of the outer sleeve 12, in the axial direction of the rear member mount. When the instant rear member mount is installed on the vehicle such that the shaft member of the vehicle body is inserted in the inner sleeve 10 while the tubular support member of the rear suspension system is fitted on the outer sleeve 12, the buffer layers 42, 44 are positioned suitable distances away from respective stop members provided on the shaft member.

As indicated above, the restrictor member 46 is fixedly supported on the axially intermediate portion of the inner sleeve 10, such that a center bore 47 engages the outer circimferential surface of the inner sleeve 10, as illustrated in FIGS. 1 and 2. This restrictor member 46 is made of a metallic material, and has a generally elongate shape, with a pair of arcuate surfaces at the opposite longitudinal ends, as indicated in FIGS. 2 and 4. These arcuate longitudinal ends are aligned with the windows 20 formed in the sealing sleeve 18. Further, the restrictor member 46 has opposed surfaces which are almost parallel to each other and which face the connecting portions 22 of the rubber body 14. Namely, the restrictor member 46 is positioned such that the direction of the length is parallel to the diametric direction of the inner sleeve 10 in which the opening 24 is formed through the rubber body 14. As indicated in FIG. 1, the restrictor member 46 substantially divides the fluid chamber 26 into two parts which are spaced apart from each other in the axial direction of the inner sleeve 10. The two parts of the fluid chamber 26 are held in communication with each other, through a first pair of restricted portions 48 and a second pair of restricted portions 50 of the fluid chamber. More specifically, the restrictor member 46, connecting portions 22 of the rubber body 14 and the outer sleeve 12 are dimensioned and shaped so that the first restricted portions 48 are defined between the connecting portions 22 and the almost parallel opposed surfaces of the restrictor member 46, while the second restricted portions 50 are defined between the diametrically opposed parts of the inner circumferential surface of the outer sleeve 12 and the arcuate opposite longitudinal end surfaces of the restrictor member 46. The first restricted portions 48 of the fluid chamber 26 are straight and parallel to each other as indicated in FIGS. 1 and 2, while the second restricted portions 50 are arcuately shaped as seen in the cross sectional view of FIG. 2, so that the second restricted portions 50 have an arcuate cross-sectional shape in a plane perpendicular to the axial direction of the inner sleeve. It is considered that the restrictor member 46 serves to define the first and second pairs of restricted portions 48, 50 of the fluid chamber 26, which permit restricted flows of the fluid between the two parts of the fluid chamber.

The arcuate longitudinal end surfaces of the restrictor member 46 are coated with respective arcuate rubber layers 52 having a suitable thickness. These rubber layers 52 are formed integrally with the rubber body 14. Described precisely, therefore, the arcuate second restricted portions 50 of the fluid chamber 26 are defined between the arcuate rubber layers 52 and the opposed parts of the inner circumferential surface of the sealing rubber layer 32 bonded to the inner surface of the outer sleeve 12.

As indicated in FIG. 2, the corner portions of the restrictor member 46 which are opposed to the inlet holes 34 in the radial direction of the inner or outer sleeve 10, 12 are removed, in order to facilitate the formation of the holes 34.

The dimension of the restricted portions 48, 50 as measured in the plane of FIG. 2 generally ranges from about 1 mm to about 6 mm.

As also shown in FIGS. 1 and 2, the two axially intermediate connecting portions 22 of the rubber body have respective axial holes 54 formed therethrough in the axial direction of the rear member mount. The axial holes 54 are arcuately shaped following the outer circumference of the rubber body 14, and are opposed to each other diametrically of the inner sleeve 10, as seen in the plane of FIG. 2.

In the instant rear member mount constructed as described above, axial vibrations applied between the inner and outer sleeves 10, 12 will cause these sleeves 10, 12 to be axially displaced relative to each other, thereby causing a relative axial movement between the restrictor member 46 and the connecting portions 22 of the rubber body 14, and a relative axial movement between the restrictor member 46 and the outer sleeve 12. Based on these relative axial movements, shearing stresses are applied to the mass of the highly viscous fluid existing in the restricted portions 48 and 50 of the fluid chamber 26, whereby the axial vibrations of a relatively wide frequency range may be effectively damped based on the shearing stresses applied to the fluid masses.

Further, the axial holes 54 formed through the connecting portions 22 of the rubber body 14 give the instant rear member mount a relatively low static spring constant or rate in the radial direction.

Where the rear member mount is installed such that the connecting portions 22 of the rubber body 14 are opposed to each other in the running direction of the vehicle, the harshness shocks given to the rear suspension system may be suitably isolated, as well as the axial vibrations having frequencies in the neighborhood of 10–15 Hz and frequencies in the neighborhood of 30–40 Hz may be effectively damped, to minimize the rattling of the rear suspension system upon starting of the vehicle and during running of the vehicle on a bumpy road surface.

The instant rear member mount exhibits substantially flat or consistent vibration damping characteristics for vibrations in a relatively wide frequency range. That is, unlike the known fluid-filled elastic mount using a fluid having a relatively low viscosity, the instant rear member mount does not exhibit an excessively high spring constant even when the mount is subjected to vibrations in a higher frequency range. In this respect, too, the instant elastic bushing is improved over the known elastic bushing using the low-viscosity fluid, in terms of the vibration and noise damping characteristics.

In the illustrated rear member mount, the highly viscous fluid in the restricted portions 48, 50 of the fluid chamber 26 are also subjected to shearing stresses due to the relative movements of the inner and outer sleeves 10, 12 in the radial direction parallel to the running direction of the vehicle (vertical direction in FIG. 2), and due to the relative movements of the inner and outer sleeves 10, 12 in the radial direction parallel to the transverse direction of the vehicle (horizontal direction in FIG. 2). Consequently, the highly viscous fluid in the instant rear member mount also contributes to improving the damping capability with respect to the input vibrations applied in the radial direction (running and transverse directions of the vehicle).

While the present invention has been described in its presently preferred embodiment, for illustrative purpose only, it is to be understood that the invention is not limited to the details of the illustrated embodiment, and the invention may be otherwise embodied.

In the illustrated embodiment, the first pair of restricted portions 48 of the fluid chamber 26 are formed between the restrictor member 46 and the connecting portions 22 of the rubber block 14, and the second pair of restricted portions 50 are formed between the restrictor member 46 and the inner circumferential surface of the outer sleeve 12, so that the axial vibrations applied to the rear member mount can be damped based on both the shearing stresses applied to the fluid masses in the first restricted portions 48, and the shearing stresses applied to the fluid masses in the second restricted portions 50. However, it is possible that only the first pair of restricted portions 48, or only the second pair of restricted portions 50 may be provided. In this case, too, the principle of the present invention may be practiced.

In the illustrated embodiment, the inlet holes 34 are formed through the outer sleeve 12 after the outer sleeve 12 is fitted on the rubber body 14 (precisely, on the sealing sleeve 18) of the intermediate product of FIGS. 3 and 4. The inlet holes 34 are closed by the rivet plugs 36 after the fluid is poured into the fluid chamber 26 through the inlet holes 34. However, the inlet holes 34 may be formed before the outer sleeve 12 is fitted on the rubber body 14, and the rivet plugs 36 may be replaced by other closure means. Further, the filling of the fluid chamber 26 with the fluid may be effected by assembling the outer sleeve 12 on the rubber block 14, within a container filled with the fluid.

Although the illustrated embodiment is adapted to be used as a rear member mount of a semi-trailing arm type rear suspension of a motor vehicle, the instant invention may be embodied as other types of elastic bushing or mount, or the fluid-filled elastic bushing of the invention have other applications or purposes.

It will be understood that the invention may be embodied with various other changes, modifications and improvements, which may occur to those skilled in the art, without departing from the spirit and scope of the invention defined in the following claims.

What is claimed is:

1. A fluid-filled elastic bushing to primarily damp vibrations applied in an axial direction of the elastic bushing, comprising:
   an inner sleeve;
   an outer sleeve disposed radially outwardly of said inner sleeve;
   an annular elastic body interposed between said inner and outer sleeves, for elastically connecting said inner and outer sleeves;
   said elastic body including a pair of axially intermediate connecting portions which define a first pair of diametrically opposed parts of an outer circumferential surface of the elastic body, said elastic body having an opening formed through an axially intermediate portion thereof in a diametric direction thereof such that said opening is partially defined by said connecting portions and is open in a second pair of diametrically opposed parts of said outer circumferential surface of the elastic body which are located between said pair of connecting portions in a circumferential direction of the elastic body, said opening being closed by said outer sleeve, at said second pair of diametrically opposed parts of said outer circumferential surface of said elastic body, whereby a fluid chamber filled with a viscous fluid having a high kinematic viscosity is defined around an axially intermediate portion of said inner sleeve;
   a restrictor member supported by said inner sleeve such that said restrictor member is accommodated within said fluid chamber, so as to substantially divide said fluid chamber into two parts spaced apart from each other in an axial direction of said inner sleeve, said restrictor member cooperating with said pair of axially intermediate connecting portions of said elastic body, to define a first pair of restricted portions of said fluid chamber, respectively, said two parts of said fluid camber communicating with each other through said first pair of restricted portions; and
   said pair of axially intermediate connecting portions of said elastic body having respective axial holes formed therethrough.

2. A fluid-filled elastic bushing according to claim 1, wherein the kinematic viscosity of said viscous fluid is at least 1000 centistokes.

3. A fluid-filled elastic bushing according to claim 2, wherein the kinematic viscosity of said viscous fluid is at least 10,000 centistokes.

4. A fluid-filled elastic bushing according to claim 2, wherein the kinematic viscosity of said viscous fluid is within a range between 100,000 centistokes and 1,000,000 centistokes.

5. A fluid-filled elastic bushing according to claim 2, wherein said viscous fluid consists of a silicone oil.

6. A fluid-filled elastic bushing according to claim 1, wherein said restrictor member cooperates with a pair of diametrically opposed parts of an inner circumferential surface of said outer sleeve which are located between said connecting portions of said elastic body in said circumferential direction, to define a second pair of restricted portions of said fluid chamber, respectively, said two parts of said fluid chamber communicating with each other through said first and second pairs of restricted portions.

7. A fluid-filled elastic bushing according to claim 6, wherein said restrictor member has a pair of arcuate surfaces which cooperate with said pair of diametrically opposed parts of the inner circumferential surface of said outer sleeve, to define said second pair of restricted portions such that each of said second pair of restricted portions has an arcuate cross sectional shape in a plane perpendicular to said axial direction of the inner sleeve.

8. A fluid-filled elastic bushing according to claim 7, wherein said pair of arcuate surfaces of said restrictor member are coated with respective rubber layers.

9. A fluid-filled elastic bushing according to claim 6, wherein said first and second pairs of restricted portions of said fluid chamber have substantially the same dimension as measured in said axial direction of said inner sleeve.

10. A fluid-filled elastic bushing according to claim 6, wherein said fluid chamber consists of a generally annular fluid chamber defined by said inner and outer sleeves, said annular elastic body and said restrictor member.

11. A fluid-filled elastic bushing according to claim 1, further comprising a sealing sleeve interposed between said elastic body and said outer sleeve.

12. A fluid-filled elastic bushing according to claim 11, wherein said sealing sleeve has a pair of diametrically opposed windows which are aligned with said second air of diametrically opposed parts of said outer circumferential surface of said elastic body.

* * * * *